United States Patent [19]

Price

[11] 4,341,247
[45] Jul. 27, 1982

[54] EXTENSION TABLE ASSEMBLY FOR POWER TOOLS

[76] Inventor: T. David Price, 648 Turin St. S., St. Paul, Minn. 55075

[21] Appl. No.: 157,077

[22] Filed: Jun. 6, 1980

[51] Int. Cl.³ .......................... B27C 9/02; B27B 25/10
[52] U.S. Cl. .................................... 144/287; 83/435.1
[58] Field of Search ............... 83/574, 648, 859, 467, 83/471.3, 435.1; 144/286 R, 286 A, 287, 1.6

[56] References Cited

U.S. PATENT DOCUMENTS

| | | | |
|---|---|---|---|
| 746,972 | 12/1903 | Marsh | 144/287 |
| 1,658,826 | 2/1928 | Yerk et al. | 144/287 |
| 2,555,217 | 5/1951 | Young | 143/132 |
| 2,722,243 | 11/1955 | Nagy | 143/132 |
| 3,342,226 | 9/1967 | Marcoux et al. | 144/286 |
| 4,068,551 | 1/1978 | Kreitz | 144/286 R |
| 4,106,381 | 8/1978 | Kreitz | 83/859 |
| 4,161,974 | 7/1979 | Patterson | 144/287 |
| 4,209,045 | 6/1980 | Bassett | 144/287 |
| 4,248,115 | 2/1981 | Brodbeck et al. | 144/287 |

FOREIGN PATENT DOCUMENTS 763280 4/1955 United Kingdom .

Primary Examiner—W. D. Bray
Attorney, Agent, or Firm—Merchant, Gould, Smith, Edell, Welter & Schmidt

[57] ABSTRACT

A versatile extension assembly (20) that is rapidly and simply attached to a power tool apparatus (25) is disclosed. Unique coupler apparatus (50, 54) and tightening means (60) provide simple one-step alignment and mounting of an elongate extension member (40) to the power tool apparatus, for rigid fastening and automatic self-alignment about three orthogonal axes. The extension assembly includes a collapsible bi-pod leg (80) and a vertical guide (45) attached to the extension member, as well as one or more measurement rules (46). The extension assembly is particularly suitable for production in kit form, and can include a measuring clamp (95) attachable to the vertical guide, a folding stand (34) for the power tool assembly and a mounting base plate (30).

40 Claims, 12 Drawing Figures

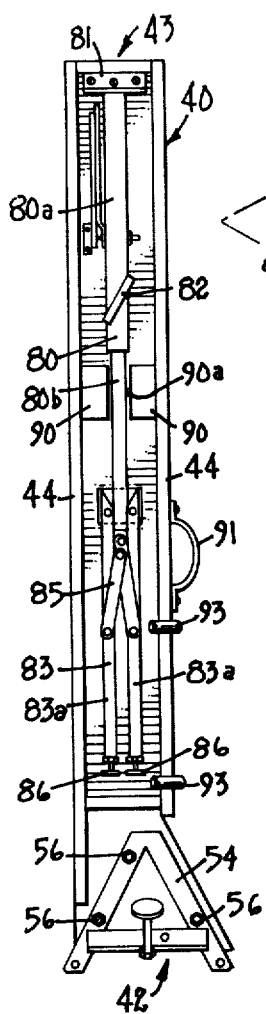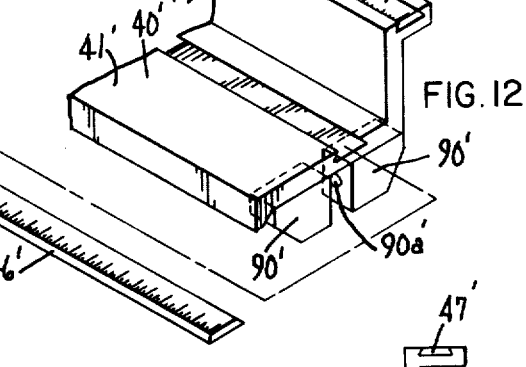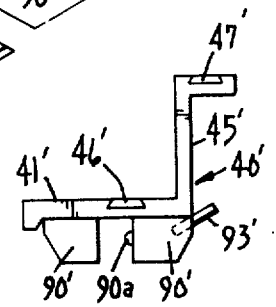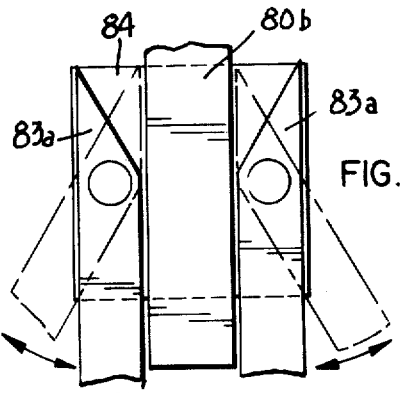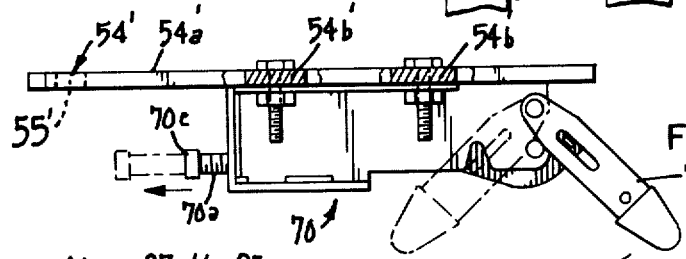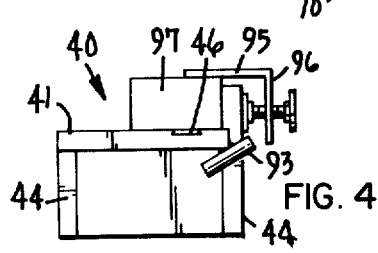

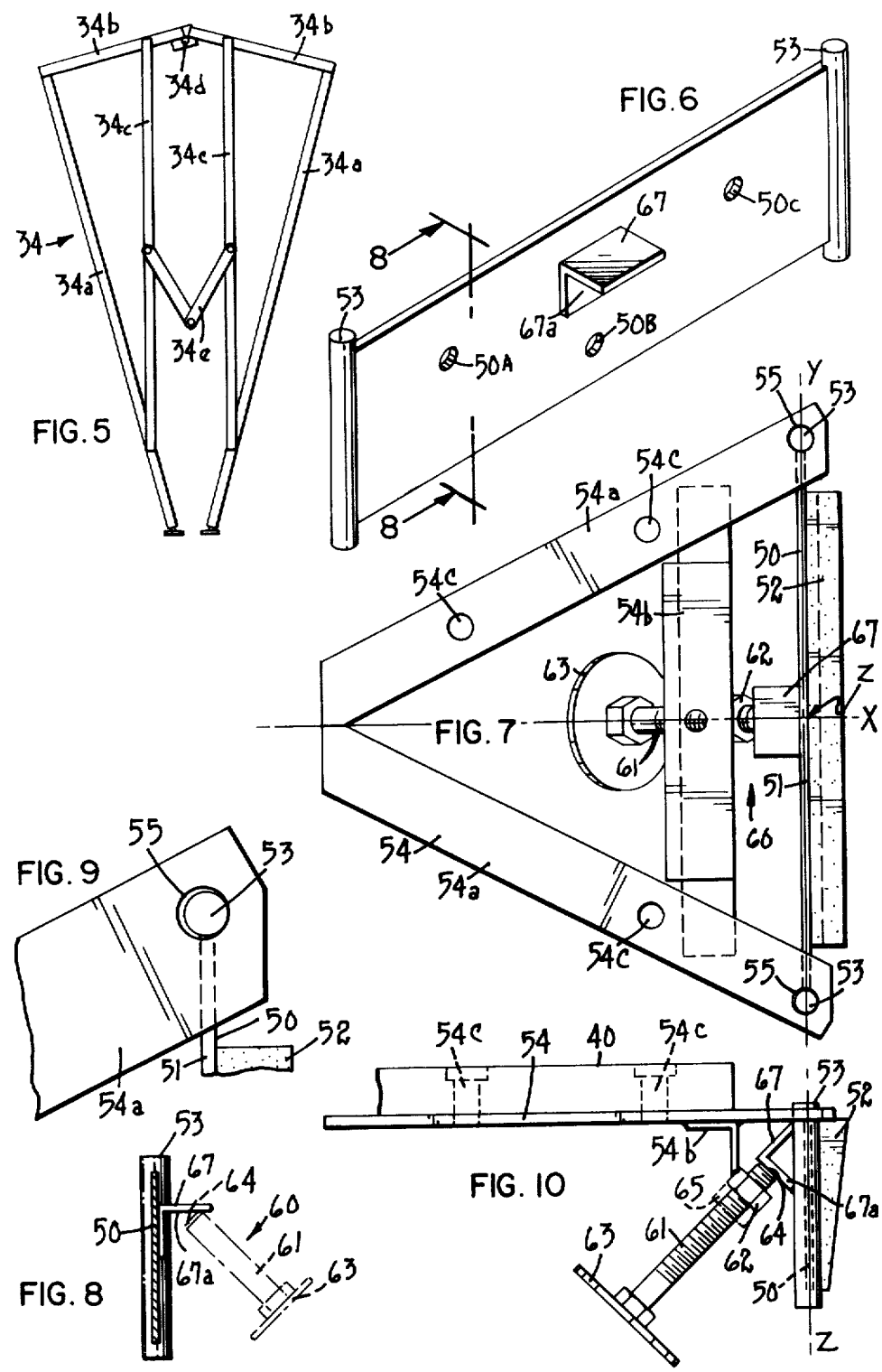

EXTENSION TABLE ASSEMBLY FOR POWER TOOLS

TECHNICAL FIELD

This invention relates broadly to accessories for power tools. More particularly, this invention relates to workpiece-supporting extension for power saws and to a unique coupling mechanism for rapidly attaching and aligning the extension to the power tool apparatus.

BACKGROUND OF PRIOR ART

A number of power tools often require an elongated support surface for holding the workpiece being acted on by the power tool, which is significantly longer than the relatively short workpiece holding surface generally provided by the manufacturer supplied table of the power tool. Typical of such power tools are the power mitre saw, the radial arm saw with the numerous attachments such as dado cutting and router heads, the table saw and the like. For such power tools, the workpiece holding table provided by the manufacturer of the power tool typically extends only one or two feet on either side of the power tool working head member. The use of such tools, however, often require work to be performed upon a substantially elongated workpiece. For example, it is not uncommon in the carpentry trade to routinely handle and perform cutting operations upon workpieces of or in excess of 16 feet in length. In such instances, it is generally necessary to accurately support the extended workpiece along a substantial portion of its length, to ensure accurate action thereon by the power tool head.

Whenever the workpiece extends significantly beyond the edge of the work table, it becomes very difficult for the operator of the power tool to hold the workpiece in position adjacent the power tool head under the levered weight of the workpiece itself. Not only is the workpiece hard to hold in position, but the accuracy of the power tool operation upon the workpiece is generally affected. In addition, binding action of the workpiece on the power tool head can result in hazardous work conditions for the operator, particularly with powerful power tools such as radial arm or table saws.

Besides the extension's need to support the distributed weight of the workpiece, it often becomes necessary for the extension to include a vertical guide member that is accurately aligned with the vertical guide of the primary table portion of the power tool. For example, when performing such sawing operations as ripping an elongate board member, if that board is bowed along its length, unless the workpiece supporting extension includes an accurately aligned vertical guide, the resultant cut made in the board will be inaccurate, and might give rise to dangerous binding action on the saw blade. The vertical guide is particularly useful on power mitre box extensions that are generally not very wide wherein long "floppy" moldings being supported thereby would otherwise tend to slip off of the sides of the extension. In such applications, the guide also helps to maintain the pliable workpiece straight, enable accurate measurements to be made thereon. From a structural viewpoint, the guide also adds rigidity to (i.e. stiffens) the extension, reducing flexing and twisting along its length. This is particularly important to the construction of long, narrow extensions such as used with power mitre saws.

The need for power tool table extensions has been recognized in the art. The solution of providing a workable extension for handling elongate workpieces is fairly straight-forward in lumber mill operations or in permanent installations wherein the same operation is provided by the workpiece, at the same location, day after day. In such cases, it is feasible to construct a heavy-duty extension that is permanently secured to the primary table of the power tool. However, where the power tool must be used for performing a number of different operations from day to day and particularly where the power tool must be portably moved from site to site (for example in building construction projects), the problem of providing a workable, accurate, reliable and portable extension apparatus becomes more acute.

A number of such extensions have been designed in the past. However, such extensions typically do not simultaneously satisfy the combined requirements of accuracy, portability, reliability and practicality necessary for construction jobs requiring ease of mobility and rapid set-up and tear-down times. In simplest form, carpenters have been known to construct make-shift extensions at the construction site by placing a board or sheet of plywood supported by saw horses, to approximately the same height as the working surface of the primary table of the power tool. Obviously, such make-shift extensions solved few of the operator's needs or problems, and required valuable set-up time. Some manufacturers of power tools provide rigid extension wings that can be bolted to the sides of the work table to increase the support area thereof. While such devices are significantly more stable than the make-shift saw horse and board extensions, they are relatively heavy to transport, require considerable set-up and tear-down time, and due to weight restrictions, are not generally constructed in lengths sufficient to adequately support longer workpieces. Another prior art device configured for supporting long workpieces, particularly for ripping operations, used a workpiece-supporting roller mounted in a yoke, and carried by a floor stand. While useful to some extent, this device is impractical for handling warped or bowed boards, which ride poorly on the roller and sag into the area between the saw blade and the roller.

More recently, several prior art power tool table extensions, described in U.S. Pat. Nos. 4,068,551 and 4,106,381 have come much closer toward solving the practical versatility and functional use requirements for power tool extension tables. The extension structures described by these patents employ an elongate extension table mounted to the primary power saw table at their proximal ends, and supported at their distal ends by vertically adjustable legs, which allow for generally co-planar alignment of the extension table surface with the work surface of the power tool table. The extension described in U.S. Pat. No. 4,106,381, however, requires time-consuming setup for securing the extension table to the primary saw table. While the structure described in U.S. Pat. No. 4,068,551 enables faster set-up time, it uses a separate pintel fastening member which can be easily lost, mislaid or damaged during movement between construction sites. Also, if the extension is to be folded against the saw vertically as claimed, it cannot be made longer than the primary saw table is high which renders its value quite limited for supporting long boards. Therefore, while providing significant improvement over prior structures, the devices described by these patents do not provide the optimum versatility and accuracy required for many projects. Further, neither of the structures described by these patents incorporates a vertical guide member for ensuring accuracy and safety for many cutting operations.

As stated above, a portable extension member for a power tool should be of light-weight, compact and include a mechanism for rapid detachment. In addition, durability and the ability to withstand severe abuse and environmental elements also become important design factors. In practical use, such extensions are exposed to severe environmental conditions and abuse, including dirt, dust, rain, careless handling by inexperienced construction workers, and severe jostling and abuse during transport from site to site with other building materials. Obviously, the extension device would be of little use if it were readily susceptible to damage or misalignment under such typical use conditions.

While it is important that the extension be rapidly detachable from the primary power tool unit, it is also important that the extension be securely, rigidly attached to the power tool when in use. If the extension is rigidly mounted to the power tool, with no free-play (noting that most of the prior art devices have some amount of free-play), it is possible to meaningfully incorporate a ruler into the extension in a way such that measurements from the proximal end of the ruler correspond to measurements from the actual cut, or from the edge of the saw blade. Such measurement accuracy is particularly important for applications requiring extreme accuracy, as for example in performing mitre cut operations wherein small fractions of an inch difference in the cut can be important. Incorporation of one or more accurate rulers within the extension enables an operator to reliably cut materials to a specified size by simply aligning the materials with the proper measurement indicator on the ruler. In some applications, it is useful to incorporate a second ruler in the extension which is gauged to correspond identically with the proximal end of the extension. Such rulers are particularly useful for making "angled" cuts where direct measurements are inconvenient. Those extensions of the prior art that provide the convenience of rapid detachability, do not in general incorporate such rigid attachment accuracy as above described, that would enable the effective use of rulers as measuring devices as an integral part of the extension.

It is often necessary, when using such power tools as radial arm saws or power mitre box saws, to repeatedly cut a number of pieces of material to exactly the same length. For such applications, it is convenient to provide a measurement block on the extension at the proper distance from the saw blade, to which the distal end of the workpiece being cut is placed in butting engagement. Where wooden extensions have been used in the prior art, a typical way of making such a measurement block has been by simply nailing a piece of wood to the extension member at the appropriate position therealong, and by discarding the block when through with it. For extensions made of metal, and particularly whose having no vertical guides, however, it is difficult if not impossible to provide such extensions with measuring blocks. For such extensions to incorporate a measuring block, the extension must be made from a material that is strong enough to resist being deformed by the clamp or by the pressure exerted by the workpiece therethrough. Typically thin sheet metal is not sufficiently strong enough to resist such pressures. Further, if the extension is not rigidly bonded to the power tool, with no free-play therebetween, usage of a measuring block can be dangerous as well as inaccurate. For example, if the extension shifts when a mitre cut is being made in a workpiece, or if the workpiece is being ripped by a saw blade, any free-play may cause the saw cerf to be pinched, resulting in jamming of the saw blade or causing dangerous "kick back"—both of which can result in injury to the operator.

The present invention overcomes many of the above-mentioned shortcomings of prior art extension apparatus for use with power saws. The present invention provides a simple, reliable and versatile method and apparatus for attaching an extension to a power tool such as a saw or table. The extension apparatus incorporates an improved coupler mechanism which provides rapid attachment of the extension to the power tool, and self alignment therewith, in a manner which is repeatable with each use, and which offers no free-play between the extension and the power tool. When used with such power tools as a power mitre box or a radial arm saw, the extension apparatus can include a vertical guide, one or more intregal rulers and measuring blocks. The entire construction of the extension apparatus is sufficiently rugged so as to withstand typical use abuse and exposure to severe environmental conditions.

SUMMARY OF THE INVENTION

The present invention discloses an elongate extension assembly for a power tool of the type having a primary table with a workpiece supportive surface addressed by the working head portion of the power tool. The invention includes novel coupling apparatus for securing the extension table to the power tool assembly as well as a number of other unique features incorporated into the extension table proper, and a kit assembly of the various elements that can be cooperatively assembled to provide an operable extension assembly.

The extension assembly includes an elongate extension member having a generally planar workpiece supportive upper surface and defining oppositely disposed proximal and distal ends. The extension is configured to extend from one side of a primary table of a power tool assembly such that its proximal end lies adjacent to the primary table and such that the upper workpiece supportive surface of the extension member defines a continuum of the workpiece supportive surface of the primary table. Rapidly attachable and detachable coupler means, having operably separable portions configured to mount respectively to the extension member and to the power tool assembly are provided for rapidly securing the proximal end of the extension member to the power tool assembly, with no free-play therebetween.

The coupler means includes a first coupler member configured for fixed engagement to the power tool assembly, either to the workpiece supportive table portion thereof or to the mounting base portion of the power tool assembly. The coupler means includes a second coupler member configured for fixed engagement to the elongate extension member adjacent its proximal end. The first and second coupler members have cooperatively mating engagement members for loosely securing the extension member into general alignment with the primary table portion of the power tool. Tightening means are cooperatively mounted to the first and second coupler members and are configured such that an operator can rapidly apply alignment pressure thereby, which is directed through a single point, between the first and second coupler members.

Such alignment pressure when applied causes the coupler members to rigidly secure the extension to the power tool assembly and to simultaneously align the extension member with the primary table about three orthogonal axes. When aligned, the upper workpiece supportive surfaces of the extension member and of the primary table portion are longitudinally, laterally and vertically aligned with one another. In a preferred configuration of the coupler member, the tightening means includes a screw member mounted to one of the coupler members, which can be easily turned by an operator to apply the alignment pressure thereby to a strike plate member which is mounted to the other coupler member. In another embodiment of the tigthening means, the screw member is replaced by a ram member operatively activated by a lever activating assembly, to apply the alignment pressure to a strike plate.

The elongate extension member preferably includes a vertical guide member extending upwardly from the workpiece supportive surface of the extension member and extending longitudinally along the length of the extension member. The guide member may be slightly spaced, in the longitudinal direction, back from the proximal end of the extension member, to facilitate operator handling by the upper workpiece supportive surface of the extension member. The extension member may include one or more ruler or measuring devices having measuring gradients extending longitudinally of the extension member. Such measuring means may, for example, be mounted within the work-supporting surface of the extension member or on or upon the vertical guide member. A supportive leg member, preferably configured for hinged mounting, is mounted to the extension member adjacent its distal end, for supporting the cantilevered distal end of the extension member of the floor. The leg member is preferably vertically adjustable and includes a base member that can be folded or collapsed for compact storage and mobility with the extension member. The extension member preferably includes retaining means for securely holding the collapsed leg member against the elongate body of the extension member when in collapsed position, for mobility purposes.

The extension assembly is particularly adaptable for marketing in ket form, wherein the elongate extension member (with or without the vertical guide), the leg member and the coupling members can be detachable provided in kit form. Alternatively, the coupling members or portions thereof could be premounted to the extension member or, could be incorporated as an integral part thereof. The kit can include a number of additional features such as a detachable, and preferably flexible, shelf configured to extend laterally out from the extension member for holding such things as plans, prints and miscellaneous items useful to the operator of the power tool, and a measuring clamp apparatus suitable for attachment to the vertical guide member and having a stop bearing surface extending laterally from the vertical guide and across the workpiece supportive surface of the extension member. The kit could also include a foldable stand and means for retainably positioning the powered tool assembly for support by the stand. Also, in an entire assembly, it may be advantageous to provide two such extension assemblies, one each extending from opposite ends of the primary table of the power tool assembly.

While the present invention will be described in combination with a particular configuration of the extension member and with respect to particular configurations of the coupling means, it will be understood that other configurations could be designed within the spirit and intent of this invention. Further, while the invention will be described with respect to preferred materials used in the construction of the various parts of the invention, it will be understood that other equally acceptable materials could be used. Certain parts of the invention, for example the various coupler members described with respect to the preferred embodiments of the invention, are illustrated herein as separate pieces which are detachably removable from the extension member. It should be understood that the invention applies equally well to devices which would incorporate one or more portions of the coupler means as integral parts of the extension table or to power tools which might incorporate portions of the coupler means into their sides or primary tables. Furthermore, while particular embodiments of the tightening means of the coupling assembly are illustrated, it will be understood that a number of variations of such tightening means may be configured within the broad spirit and intent of this invention, as along as their cooperative function is that of the claimed invention.

BRIEF DESCRIPTION OF THE DRAWING

Referring to the Drawing, wherein like numerals represent like parts throughout the several views:

FIG. 2 is a bottom view of the right-hand extension member portion of the assembly illustrated in FIG. 1, shown in a collapsed state;

FIG. 3 is an enlarged fractional view of the hinged connection of the bi-pod leg portion of the extension apparatus illustrated in FIG. 2;

FIG. 4 is a partial end view of the rightand extension apparatus illustrated in FIG. 1, illustrating attachment of the measuring block thereto;

FIG. 5 is a front-view of the foldable stand portion of the assembly illustrated in FIG. 1, wherein the stand is illustrated in folded position;

FIG. 6 is an enlarged perspective view of one of the coupler plate portions of the assembly illustrated in FIG. 1;

FIG. 7 is an enlarged view in top elevation of one coupler pair illustrated in FIG. 1, illustrating the cooperative attachment between a coupler plate and coupler bracket;

FIG. 8 is a cross-sectional view of the coupler plate illustrated in FIG. 6, as taken along the Line 8—8 of FIG. 6;

FIG. 9 is an enlarged fractional view of a portion of the coupler assembly illustrated in FIG. 7, illustrating the positional relationship of one of the alignment studs and holes;

FIG. 10 is a view in side elevation of the coupler assembly illustrated in FIG. 7, depicting an alternatively shaped coupler strike plate;

FIG. 11 is a view in side elevation of an alternative coupler bracket member that can be used in the extension apparatus assembly of FIG. 1;

FIG. 12 is a fractional perspective view of an alternative extruded construction of the extension portion of the assembly illustrated in FIG. 1; and FIG. 13 is an end view of the extension illustrated in FIG. 12.

DETAILED DESCRIPTION OF THE INVENTION

Figure 1:
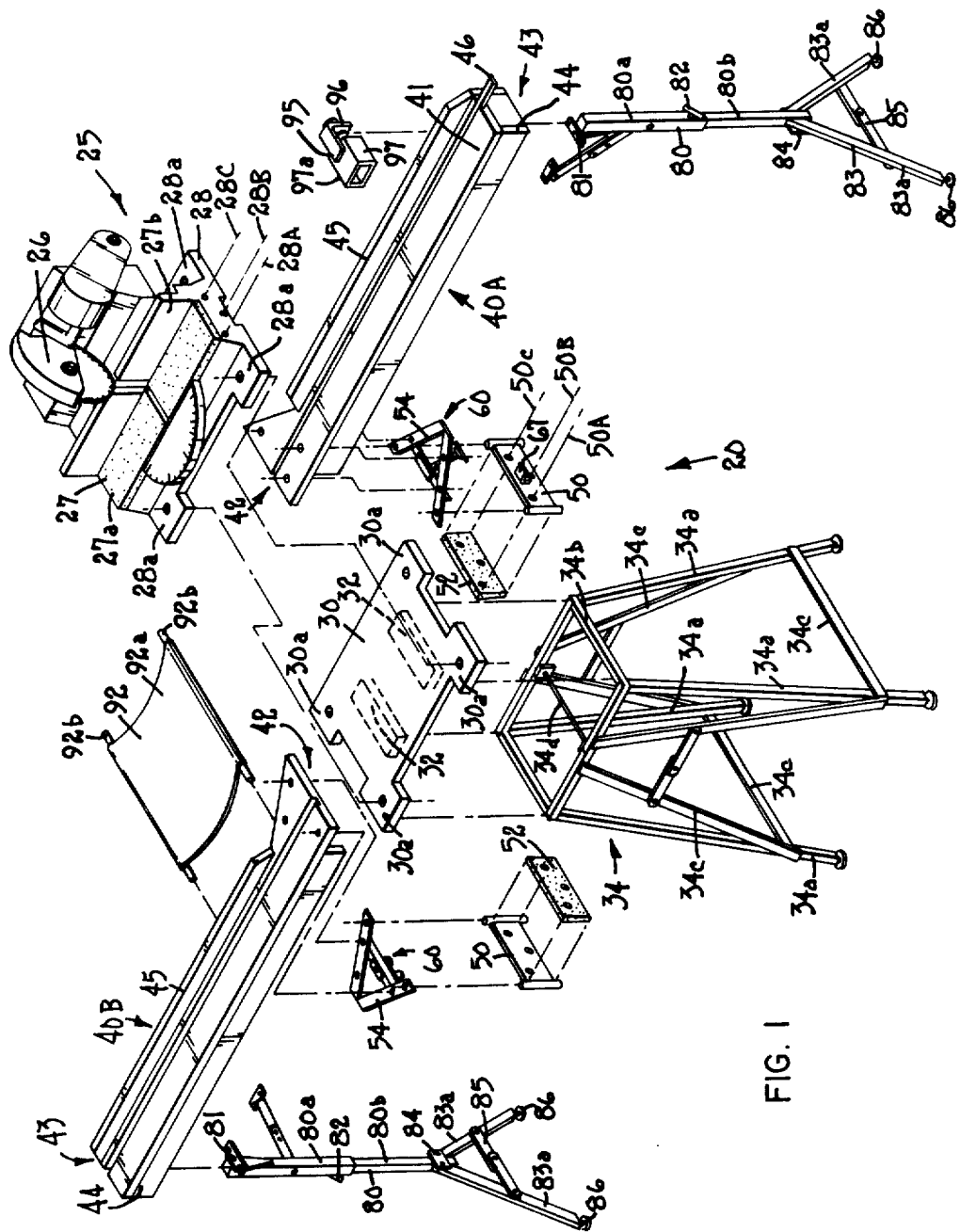
FIG. 1 is an exploded perspective view of an extension assembly illustrated as applicable for use with a power mitre saw box, and constructed according to the principles of this invention.

Referring to the Figures, there is generally disclosed in exploded view, an extension assembly 20 for a power tool apparatus generally designated at 25. The extension assembly 20 of the invention will be described with respect to its application to a power tool apparatus 25 which is illustrated as a power mitre box generally having a movable power head 26, a primary table portion 27 having an upper surface 27a suitable for operatively supporting a workpiece thereon and a vertical guide section 27b projecting upwardly at a right angle from the general plane of the upper surface 27a and extending longitudinally therealong. The primary table portion 27 as well as the movable power head 26 are supported upon a support base 28. The support base 28 has a plurality of support leg portions 28a each having a hole drilled therethrough for mounting the support base to a mounting surface. The movable power head 26 is generally movable under direction by an operator, with respect to the upper surface 27a of the primary table portion 27, to act upon a workpiece (not illustrated) supported thereby. For the power mitre box illustrated in FIG. 1, the saw blade 26 is operable to cut a workpiece supported on the upper surface 27a at accurate predetermined angles.

The power tool apparatus 25 may be mounted upon any stationary support surface suitable for stably and reliably supporting the weight of the power tool. Typically, such power tool assemblies such as a power mitre saw are supported upon a stand at approximately waist height of the operator. Such power tools as a power mitre box are typically used for short periods of time on a number of different construction sites, it is desirable for the entire power tool apparatus 25 to be rapidly movable from place to place, without requiring time-consuming set-up and tear-down operations. Accordingly, the present invention provides in part, a support means for the power tool apparatus 25 proper, which satisfies the rigidity, stability, reliability and portability requirements.

Referring to FIG. 1, a base plate 30 of generally planar construction, and having mounting terminals generally designated at 30a, it is provided for cooperative mounting to the support base 28 of the power tool apparatus 25. The mounting terminals 30a have holes formed therethrough for cooperatively aligning with the holes formed through the leg portions 28a of the support base 28. Appropriate fastening means (i.e. bolts or otherwise) are placed through the aligned holes of the leg portions 28a and the mounting terminals 30a to securely fasten the base plate 30 to the bottom of the support base 28. It will be understood that the configuration of the base plate 30 and its mounting terminals 30a will vary to identically correspond to the mounting requirements of the particular power tool apparatus 25 which is employed. The base plate 30 has a pair of locator lugs 32 fastened to its lower side, for retainably securing the base plate and power tool apparatus 25 mounted thereon to a support stand 34. The support stand may be of any suitable configuration, preferably of lightweight and durable construction for ease of mobility, and preferably foldable or collapsible. In the preferred embodiment configuration of the stand illustrated in FIG. 1, the stand has a plurality of support legs 34a extending from floor engaging tips at their lower terminals to an open upper framework portion, generally designated at 34b. The support legs 34a are interconnected by means of a plurality of brace members 34c for providing stability and rigidity to the stand. The upper framework 34b is hinged, and pivots about the pivot pin generally designated at 34d. See FIG. 5 for a more detailed illustration of the support stand 34 illustrated in its folded position. A pair of pivotally hinged cross-brace members 34e lock (as illustrated in FIG. 1) to provide rigidity to the support stand when opened to an operative position, and fold (as illustrated in FIG. 5) to enable pivotal folding of the stand 34 about the pivot pin 34d to facilitate mobility thereof. The outer dimension spacing of the locator lug members 32 is configured such that when the base plate 30 is placed upon the upper framework portion 34b of the support stand 34, the locator lugs 32 will frictionally engage the inner portions of the upper framework 34b, to position the base plate in proper orientation on the stand, and to retainably hold the power tool apparatus 25 upon the stand. The advantage of the locator lug 32 structure is that no tie-down clamps or straps are needed to maintain the power tool apparatus 25 in safe reliable position upon the stand 34. Obviously, the use of tie-down straps or clamps require additional set-up and tear-down time, which cannot always be afforded by an operator. The base plate 30 may be constructed of any rigid material suitable for safely supporting the weight of the power tool apparatus 25, and is in the preferred embodiment, constructed of plywood. Similarly, the support stand 34 may be constructed of any material suitable for safely and stably supporting the weight of the power tool apparatus 25. In the preferred embodiment, the support stand 34 is constructed of light-weight steel, however, other materials such as aluminum or other metal alloys could be used as well.

The extension assembly 20 illustrated in FIG. 1 includes two elongated extension members, generally designated at 40A and 40B. The extension members 40A and 40B are of mirror-image construction with respect to one another; therefore, further discussion will be had only with respect to one of the extension members. It will be understood that one or two such extension members could be employed with a power tool apparatus, depending upon the particular needs for supporting elongate workpieces. For example, it is convenient when using a power tool apparatus 25 of the power mitre box type, to have such elongate extension members 40A and 40B extending from both ends of the primary table 27. For such an application, it is also desirable for the left-hand elongate extension member 40B to be approximately six to seven feet in length; whereas the right-hand extension member 40A need only be approximately three to five feet in length. It will be understood throughout the discussion of the extension members 40, that such extension members can be configured to any length appropriate to the particular application to which the extension will be put.

The elongate extension member 40 (see FIGS. 1 and 2) generally includes an upper generally planar work-supporting surface 41 terminating at proximal 42 and distal 43 ends; wherein the proximal end of the extension member 40 is that end which is configured to abut the end of the primary table portion 27, and the distal end is the opposite end of the extension member. The proximal end 42 of the extension member 40 is widened relative to the distal end, in the embodiment illustrated, for cooperatively accepting one portion of the coupling means, hereinafter described. It will be understood that the mitre-box application for the extension member 40 being described requires only a relatively narrow elongate extension member, and that for such a narrow extension member, widening of the proximal end thereof is appropriate to accommodate the coupling apparatus. However, for applications requiring substantially wider extension members 40, such widening may not be necessary or practical. In that embodiment of the invention illustrated in FIGS. 1 and 2, the extension member 40 is constructed from wood, and includes a box-like lower support structure, generally designated at 44, for adding structural rigidity and strength along the longitudinal length of the upper surface 41 of the extension 40. It will be understood that the extension member 40 may also be constructed of other materials such as steel or aluminum. An example of such an alternate construction of the extension member 40, made from extruded aluminum, is illustrated in the fractional view of FIG. 12. Since, when constructed of aluminum, the material itself offers significantly more rigidity than wood over an extended length, the extension member 40' (FIG. 12) does not include the box-like support members 44 as illustrated with respect to the first-disclosed embodiment of the extension member 40.

The extension member also preferably includes a vertical guide 45 extending generally upward from (and preferably at a right angle to) the upper surface 41 of the extension member 40, and extends longitudinally with the extension member 40. The vertical guide 45 is constructed to longitudinally align with the vertical guide portion 27b of the primary table 27, when the extension member 40 is operatively connected therewith (as hereinafter described).

Due to the unique coupling mechanism of this invention which provides a tight coupling between the extension member 40 and the primary table 27, with no freeplay therebetween, and in a manner which provides repeatable identical positioning between the extension member and the primary table each time the extension member is attached to the table, the extension member is readily adaptable to the use of measurement indicators longitudinally extending down the length of the extension member. Such measurement indicators can be, for example, of the rule or ruler type, such as indicated at 46 in FIG. 1, wherein the ruler device is slidably mounted within the base portion of the extension member 40 and is readable from the upper surface 41 thereof. Such measurement devices can also be used on the vertical guide 45 of form an integral part thereof, as is illustrated at 47 in FIG. 12. Referring to FIG. 12, it will be noted that the retaining slots which hold the ruler member in the extension member could be dove-tailed shaped as illustrated, to prevent removal of the ruler member vertically upward therefrom. Such measurement devices may be gauged to correspond either to the outside edge of the saw blade, or could be gauged to have measurements corresponding with the proximal end of the extension itself. In the latter configuration, workpieces can be aligned with the end of the extension and measured as desired, without the use of an external measurement device. This type of measurement scheme proves useful when making angled cuts where direct measurement (as for example where the ruler is gauged to the edge of the blade) is inconvenient.

The vertical guide, besides providing a useful backstop for retainably holding a workpiece on to the upper surface 41 of the extension member 40 also provides structural support to stiffen the extension against flexing and twisting motion along its longitudinal length. Such guides, are also useful for insuring accuracy in the ripping of elongate warped or bowed materials, and provide an additional safety factor for preventing elongate and narrow workpieces from slipping off of the work table during the cutting process.

It will be noted that the vertical guide 45 is, in the preferred embodiment, slightly longitudinally spaced back from the proximal end of the extension member by a distance of approximately six inches. This spacing is advantageous to the operator, for grasping and handling a workpiece that has been placed into engagement with the vertical guides 45 and 27b (i.e. enables the operator to grasp the workpiece through that opening). Further, the opposite ends of the vertical guide 45 are illustrated as beveled, to smoothen the lines of the guide 45, and to minimize damage to the vertical guide during handling and movement of the extension assembly.

Connection of the extension member 40 to the primary table portion 27 is accomplished by means of a unique coupling mechanism that enables rapid connection and selfalignment by an operator who need only operate a single activating member during the connection process. The coupling apparatus includes a first coupler member configured in the preferred embodiment, in the form of a coupler bracket 50, a second coupler member configured in the preferred embodiment in the form of a coupler plate 54, and tightening means, generally designated at 60. The coupler bracket 50 is configured, in the preferred embodiment, to be bolted or otherwise fixedly secured to the support base 28 of the power tool apparatus 25. For this purpose, the coupler bracket 50 has a plurality of holes (generally designated at 50A, 50B and 50C). Corresponding holes (28A, 28B and 28C) are drilled (and could be threaded) into the side portion of the support base 28 to which the coupler bracket 50 is to be attached. Appropriate bolts or other anchoring means are secured through the holes 50A-28A, 50B-28B and 50C-28C, to secure the coupler bracket 50 to the support base 28. Holes 50A, B and C are larger than corresponding holes 28A, B and C for adjustment purposes. A shim block 52 may be inserted between the coupler bracket 50 and the mounting base 28 to provide the proper spacing or angular attitude of the coupler bracket 50. For example, if the side of the support base 28 to which the coupler bracket 50 is to be attached is disposed at an angle to the vertical, it may be desirable to provide a wedge-shaped shim block, as illustrated in FIG. 1, so that the coupler bracket 50, when mounted to the base 28, will be generally vertically aligned. The coupler bracket 50 includes a pair of upwardly projecting stud connectors 53 mounted to laterally opposite ends of the coupler plate, and projecting, in spaced apart relationship, above the upper surface of the coupler bracket 50. The shim block 52 maintains a spacing between the side of the support base 28 and the stud connectors 53 to enable receptor means (hereinafter described) of the second coupler member 54 to cooperatively engage the stud connectors 53 (refer to FIGS. 7, 9 and 10).

The coupler plate 54 comprises in the preferred embodiment, a pair of diverging frame members 54a connected at a vertex and divergingly outwardly therefrom to a pair of receptor holes 55 sized slightly larger than the diameter of the stud connectors 53. A cross-brace member 54b connects the diverging brace members 54a adjacent their open end, and provides a mounting platform for a portion of the tightening means, hereinafter described. The brace members 54a of the coupler plate 54 include a plurality of holes, generally designated at 54c through which fastening means (not illustrated) such as bolts, screws or other fasteners can be inserted, to fixedly secure the coupler plate to the proximal end of the extension member 40. In the preferred embodiment of the invention, the proximal end of the extension member 40 has a plurality of holes drilled through the member forming the upper support surface 41 thereof, which cooperatively align with the holes 54c of the mounting plate 54, to receive engagement bolts 56 therethrough for securing the coupler plate 54 to the underside of the extension member 40 (see FIG. 2). Holes 54c are larger than accompanying holes in proximal end of extension, to allow for adjustment when the unit is assembled.

The receptor holes 55 are sized to cooperatively identically align with and receive the stud connectors 53 of the coupler bracket 50, and are spaced slightly back from the free ends of the diverging brace members 54a. The shim block 52 provides adequate spacing between the general plane of the coupler bracket 50 and the support base 28 so as to enable the coupler plate 54 to be cooperatively placed into general alignment with the coupler bracket 50 such that the receptor holes 55 can cooperatively engage the stud connectors 53, without binding of the free ends of the diverging braces 54a against the side of the support stand 28. (See FIGS. 7 and 10). The connector plate 54 is initially aligned and mounted to the proximal end of the extension member 40 such that the edge of the extension member 40 at its proximal end is spaced slightly back from the free ends of the diverging brace members 54a (see FIG. 10), to enable ease of visual alignment when an operator is cooperatively connecting the receptor holes with the stud connectors. The coupler plate 54 is initially mounted to the proximal end of the extension member 40 such that when the connector plate 54 is loosely connected by way of the receptor holes 54 and stud connectors 53 combination, the extension member 40 will be roughly longitudinally aligned with the upper support surface 27a of the primary table 27, with the respective guide members 27b and 45 being in general longitudinal alignment. It is also understood, that the connector bracket 50 is mounted to the support base 28 at a "height" such that when the coupler plate 54 cooperatively engages the coupler bracket 50 (via the stud connectors 53 and the receptor means 55), that the upper surface 41 of the extension member 40 will be in general co-planar alignment with the upper surface 27a of the primary table 27. It will be noted that the laterally extending upper surface 51 of the coupler bracket 50 provides a stop or bearing surface upon which the lower surfaces of the free ends of the diverging braces 54a rest when the receptor holes 55 cooperatively engage the stud connectors 53 (see FIGS. 6, 7 and 10).

The tightening means 60 basically comprises in the preferred embodiment of the invention, a threaded elongate bolt member 61 threadly secured to the cross brace member 54b by means of a mounting nut 62 that is, in the preferred embodiment, welded to the cross brace 54b (see FIGS. 7 and 10). The mounting nut 62 is disposed, in the preferred embodiment, so as to incline the longitudinal axis of the bolt member 61 at approximately a 45 degree angle with respect to the general plane of the coupler plate 54. The bolt member has a first (lower) end to which is secured a cylindrical handle 63 suitable for ease of grasp by an operator, for turning the bolt member 61, and an oppositely disposed force-directing end, generally designated at 64. A lock nut 65 (indicated in phantom in FIG. 10) may be provided to lock the longitudinal position of the bolt 61 relative to the mounting nut 62.

The second portion of the tightening means comprises a strike plate member 67 mounted on the coupler bracket 50 (see FIG. 6). According to a first preferred configuration, the strike plate member has a striking surface 67a that lies in a plane generally parallel to the workpiece supporting surface 41 of the extension 40 (as illustrated in FIGS. 6 and 8). The strike plate member 67 can, however, assume other varying configurations. One such alternate configuration is illustrated in FIG. 10, wherein the striking surface 67a is disposed to lie generally perpendicular to the longitudinal axis of the bolt 61.

The tightening means 60 is configured to rapidly apply alignment pressure directed through the bolt, by way of its force directing end 64, to the striking surface 67a of the strike plate member 67 to cause the coupler members 54 and 50, by way of their engagement (via the stud connectors 53 and receptor hole means 55) to rigidly secure the extension 40 to the power tool assembly 25 and to simultaneously align the extension 40 with the primary table 27 about three orthogonal axes. These alignment axes are diagrammatically illustrated as the "X", "Y" and "Z" axes respectively in FIGS. 7 and 10. As the bolt member 61 is turned by the operator to apply force to the striking surface 67a of the strike plate 67, the coupler plate 54 is simultaneously pulled down and back (see FIG. 10) relative to the stud connectors 53 such that the stud connectors 53 exert alignment and tightening pressure against the forward bearing surfaces (see FIG. 9) of the receptor holes 55. This action simultaneously longitudinally, laterally and vertically aligns the extension 40 with the primary table 27, in a manner which allows no free-play therebetween. Accordingly, a simple one-step tightening motion of a single tightening member by the operator, performs the simultaneous alignment and tightening operation—all of which can be performed in a matter of seconds.

It will be understood that alternate tightening configurations, which are configured to direct and apply the alignment pressure through a single point, as above described, can be configured. One such alternate configuration which employes a longitudinally moving ram member mounted to the coupler plate 54' is illustrated at 70 in FIG. 11. Referring thereto, a ram member 70a is longitudinally movable in a direction generally parallel to the general plane of the coupler plate 54 to apply the alignment pressure therethrough to a striking surface 67a of a strike plate member 67 (not illustrated). It will be understood that when the ram force is directed in such a horizontal manner as illustrated in FIG. 11, that the corresponding striking surface of the strike plate would be inclined at an angle, such as is illustrated for the strike plate member depicted in FIG. 10. The ram assembly 70 is appropriately connected to the coupler plate 54. In the embodiment illustrated in FIG. 11, the ram assembly 70 is connected to a pair of cross brace members 54b' as illustrated. Appropriate activator means for the movable ram member 70a may include any appropriate means suitable for applying levered ram pressure to the ram member 70a. In the preferred embodiment, such activating means is achieved by means of a lever activated assembly 70b having an over-center locking mechanism whereby the forward (clockwise direction in FIG. 11) motion of the lever 70b is maintained in a locked position until disengaged by an operator. It is understood that the forward tip 70c of the ram member 7a comprises the force-directing end of the ram member.

The extension 40 is provided with a collapsible folding leg member generally designated at 80. The leg 80 is secured to the distal end of the extension member 40 by a hinge bracket 81 such that the leg can be folded up against the bottom surface of the extension table for storage and mobility purposes (see FIG. 2). In the preferred embodiment, the leg 80 has an upper casing portion 80a into which telescopically slides a lower leg portion 80b. The relative telescopic positioning (i.e. height adjustment) of the leg 80 is maintained at the desired position by means of an appropriate lock mechanism 82. In the preferred embodiment, the lock mechanism 82 comprises merely a threaded set-screw type of a lock arrangement. A bi-pod lower leg arrangement is secured to the lower leg member 80b. The bi-pod leg 83 is collapsibly foldable (as illustrated in FIG. 2), for storage purposes. The bi-pod leg 83 basically comprises a pair of primary leg members 83a pivotally mounted to a mounting bracket 84 which is in turn secured to the lower leg portion 80b. The upper portions of the leg struts 83a are angled (see FIG. 3) such that when movable to the "open" position, their upper ends engagedly abut to the side portions of the lower leg strut 80b, to provide support rigidity to the leg assembly. When folded down to the "closed" or collapsed position (see FIG. 3), the longitudinal edges of the leg members 83a lie in resting engagement with the sides of the lower leg strut 80b (as illustrated in FIGS. 2 and 3) thus maintaining the lower leg portions 83a and generally parallel relationship with the lower leg strut 80b when in the folded position (see FIG. 2). A foldable/locking cross brace member 85 adds further support to the bi-pod legs 83, when in an operable "open" position. The floor-engaging ends of the bi-pod leg 83 are fitted with screw-type foot members 86, for providing fine height adjustment to accommodate for uneven floor surfaces.

The lower side of the extension member 40 includes a keeper member 90, including a spring-loaded pin member 90a for retainably maintaining the leg 80 into folded engagement with the bottom side of the extension assembly, to facilitate portability of the extension assembly. The extension assembly is also fitted with a handle 91 which is mounted along the longitudinal length of the extension member 40, so as to balance the weight of the extension and leg assembly when collapsed, on either side of the handle, for ease of carrying.

The extension assembly may also be fitted with a detachable shelf member, generally designated at 92 in FIG. 1. In the preferred embodiment, the shelf 92 is formed from a section of canvas material 92a stretched between two support struts 92b. The engaging ends of the support struts 92b cooperatively fit within a pair of receptor members 93 (see FIGS. 2 and 4) mounted within the side of the extension 40. The receptor members are, in the preferred embodiment, configured to snugly engage the support struts 92b such that the shelf portion 92a extends laterally outward from the rear side of the extension member (see FIG. 1). The shelf 92 is particularly useful for holding such items as plans, pencils or other such items used by the operator of the power tool assembly.

It is often necessary for an operator to repetitively cut a number of items to the exact same length. To facilitate this operation, the extension apparatus can be provided with a measuring clamp apparatus 95 (see FIGS. 1 and 4). The measuring clamp 95 has a fastening bracket generally designated at 96 configured to overlie the vertical guide 45 and adjustable for enabling the clamp 95 to be slid longitudinally down the length of the vertical guide 45 and clamped to the desired position therealong. The clamp 95 further has a block member 97 connected to the bracket 96 and defining a stop bearing surface 97a extending laterally across the upper workpiece supporting surface 41 of the extension member 40. A workpiece can be butted up against the stop bearing surface 97a of the measuring clamp so that subsequent operations to the workpiece can be thereafter performed on a repetitive basis. The rigidity of connection between the extension member and the support stand 28 which is provided by the coupling means of this invention enables, in combination with the vertical guide, effective use of the measuring clamp.

It can be appreciated from the foregoing description, that attachment of the extension member to the power tool assembly 25 is rapidly performed by an operator. Assuming that the coupler plate and coupler bracket have been properly installed respectively on the support base 28 and the extension member 40, the operator merely places the free ends of the diverging braces 54a so as to cooperatively engage the receptor holes 55 over the stud connectors 53, and lowers the braces 54a until they come into resting engagement with the bearing surface 51 of the coupler bracket 50. In this position, the extension member 40 is positioned in general alignment with the primary table 27. The operator next merely tightens the bolt 61 (or alternate tightening means) to rapidly apply alignment pressure through the strike plate 67, for aligning (vertically, laterally and horizontally) the extension member 40 with the upper support surface 27a of the primary table 27. Additional support is provided for the distal end of the extension member by the telescoping leg 80. To set the proper height of the leg, the operator merely loosens the lock mechanism 82 until the leg is positioned at the proper level, and retightens the lock member. To remove the extension member from the power tool apparatus, the reverse process is performed. Thereby, the tightening mechanism is loosened, the proximal end of the extension member is lifted to disengage the first and second coupler members, and the bi-pod leg is collapsed and folded up under the extension member, and is retained in its folded position by the keeper assembly 90.

The invention is particularly suitable for marketing in kit form, wherein the various individual members comprising the composite elongate extension assembly can be sold as separate items with instructions as to how they are to be assembled together to form a working assembly. For example, the coupling means could be marketed by itself or in combination with the extension member, the extension member and the leg, or any other combination of the various elements described herein before.

The unique coupler design of the invention makes the structure highly tolerant to physical abuse and exposure to severe environmental conditions, without any sacrifice of accuracy. Since the mating surfaces of the coupling and tightening means are small and since tolerances between the mating parts are not extremely critical to rigidity or to alignment, the coupler assembly is relatively unaffected by dirt or other debris commonly produced during operative use or transport. The design of the present invention offers a coupling method which cannot be bumped out of adjustment in normal use.

Other modifications of the invention will be apparent to those skilled in the art in light of the foregoing description. This description is intended to provide specific examples of individual embodiments which clearly disclose the present invention. Accordingly, the invention is not limited to these embodiments or to the use of elements having these specific configurations and shapes as presented herein. All alternative modifications and variations of the present invention which fall within the spirit and broad scope of the appended claims are included.

I claim:

1. An improved coupler apparatus for securing an elongate extension to a power tool assembly, comprising:
   (a) a first coupler member configured for fixed engagement to a power tool assembly having a primary table portion;
   (b) a second coupler member configured for fixed engagement to an elongate extension; said first and second coupler members having cooperatively mating engagement members for loosely securing said extension in general alignment with said primary table portion; and
   (c) tightening means cooperatively mounted to said first and said second coupler members for rapidly applying alignment pressure directed through a single point between said first and said second members, causing said coupler members to rigidly secure said extension to said power tool assembly and to simultaneously align said extension with said primary table about three orthogonal axes; whereby the upper workpiece supporting surfaces of said extension and said primary table portion are longitudinally, laterally and vertically aligned with one another.

2. An improved coupler apparatus as recited in claim , wherein said tightening means comprises a screw member movable to cooperatively engage a strike plate, said screw member and said strike plate being separably mounted on said first and said second coupler members in a manner such that said screw member is operatively movable to apply said alignment pressure to said strike plate when in engagement therewith.

3. An improved coupler apparatus as recited in claim 2, wherein said screw member comprises a single threaded elongate bolt member terminating at a force directing surface at one end and a handle, suitable for operator manipulation, at the other end; whereby said force directing surface is cooperatively configured for engaging said strike plate.

4. An improved coupler apparatus as recited in claim 2, wherein said screw member is mounted to said second coupler member and said strike plate is mounted to said first coupler member; wherein the longitudinal axis of said screw member forms an acute angle with the general plane of said workpiece supporting surface of said extension.

5. An improved coupler apparatus as recited in claim 4, wherein said strike plate defines a striking surface, disposed such that when said first coupler member is operatively mounted to said power tool assembly, said striking surface lies in a plane generally parallel to said workpiece supporting surface; whereby said alignment pressure is applied through said force directing surface to said striking surface.

6. An improved coupler apparatus as recited in claim 4, wherein said strike plate defines a striking surface, disposed such that when said first coupler member is operatively mounted to said power tool assembly, the general plane of said striking surface lies generally perpendicular to the longitudinal axis of said screw member, whereby said alignment pressure is applied through said force directing surface to said striking surface.

7. An improved coupler apparatus as recited in claim 1, wherein said first coupler member comprises a coupler plate configured for cooperative mounting to said power tool assembly adjacent one longitudinal end portion of said primary table, said first coupler member further defining a pair of spaced outwardly projecting alignment studs; and wherein said second coupler member defines a pair of spaced receptor members sized to matingly engage said alignment studs; wherein said alignment studs and said receptor members comprise in combination said cooperatively mating engagement members.

8. An improved coupler apparatus as recited in claim 7, wherein said tightening means includes means for directing a portion of said alignment pressure through said single point in a manner wherein said alignment studs are moved into tight compressive engagement with said engagement members, with no free-play therebetween.

9. An improved coupler apparatus as recited in claim 7, wherein said tightening means comprises a screw member movable to cooperatively engage a strike plate, said screw member and said strike plate being separably mounted on said first and said second coupler members in a manner such that said screw member is operatively movable to apply said alignment pressure to said strike plate when in engagement therewith.

10. An improved coupler apparatus as recited in claim 1, wherein said tightening means comprises a ram member movable, when operatively mounted, in the longitudinal direction of said extension, to cooperatively engage a strike plate; said ram member and said strike plate being separably mounted on said first and said second coupler members in a manner such that said ram member is operatively movable to apply said alignment pressure to said strike plate when in engagement therewith.

11. An improved coupler apparatus as recited in claim 10, wherein said comprises lever means operatively connected with said ram member for moving said ram member into and out of operative engagement with said strike plate.

12. An improved coupler apparatus as recited in claim 10, wherein said ram member is mounted to said second coupler member and said strike plate is mounted to said first coupler member; wherein the longitudinal axis of said ram member, when operatively mounted to said extension, lies generally parallel to the workpiece supporting surface of said extension.

13. An improved coupler apparatus as recited in claim 12, wherein said strike plate defines a striking surface, operatively disposed at an angle to the longitudinal direction; whereby said alignment pressure is applied through said ram member to said striking surface.

14. Apparatus configured to be sold in kit form for forming, when assembled, an elongate workpiece holding extension assembly for a power tool assembly of the type having a mounting base and a primary table with a workpiece supporting surface addressed by a working head member of the power tool, comprising:

(a) an elongate extension member having a generally planar workpiece supportive upper surface, said extension member defining proximal and distal ends and being configured to extend from one side of a primary table of a power tool assembly such that said proximal end lies adjacent the primary table and said upper workpiece supportive surface of the extension member defines a continuum of the workpiece supportive surface of the primary table;

(b) a first coupler member configured for fixed engagement to the power tool assembly having a primary table portion;

(c) a second coupler member configured for fixed engagement to said elongate extension member, said first and second coupler members having cooperatively mating engagement members for loosely securing said extension in general alignment with the primary table portion; and (d) tightening means cooperatively mounted to said first and second coupler members for rapidly applying alignment pressure directed through a single point between said first and second members, causing said coupler members to rigidly secure said extension to the power tool assembly and to simultaneously align said extension with the primary table about three orthogonal axes, whereby the upper wood piece supporting surfaces of said extension and the primary table portion are longitudinally, laterally and vertically aligned with one another.

15. Apparatus as recited in claim 14, wherein said elongate extension includes means adjacent said proximal end thereof for mounting one of said separable coupling means portions thereto.

16. Apparatus as recited in claim 14, further including a leg member configured for attachment to said elongate extension for operatively supporting said distal end thereof.

17. Apparatus as recited in claim 16, including hinge means for pivotally securing said leg member to said extension member.

18. Apparatus as recited in claim 16, wherein said leg member further includes adjustment means for varying the operative length of the leg member.

19. Apparatus as recited in claim 16, wherein one end of the leg member comprises a bi-pod foldable leg structure.

20. Apparatus as recited in claim 16, wherein said extension member further includes retaining means for retainably securing said leg member in compact engagement along the longitudinal length of the extension member for facilitating mobility of the assembled extension and leg assebly when not in operative use.

21. Apparatus as recited in claim 14, wherein said extension member further includes an elongate vertical guide member extending upwardly from said workpiece supportive surface of the extension member and extending longitudinally along the length of said extension member.

22. Apparatus as recited in claim 21, wherein said vertical guide member is longitudinally spaced slightly back from the proximal end of the extension member; whereby operator handling of a workpiece supported by said upper workpiece supportive surface of the extension member is facilitated.

23. Apparatus as recited in claim 21, further including measuring clamp apparatus configured for attachment to said vertical guide member, said clamp apparatus having a stop bearing surface extending laterally from the vertical guide and across the workpiece supportive surface of the extension member.

24. Apparatus as recited in claim 23, wherein said measuring apparatus includes means for adjustably slidably connecting said clamp apparatus for connection along the longitudinal length of said vertical guide.

25. Apparatus as recited in claim 14, further including shelf means configured for detachable connection to said extension member; and wherein said extension member includes means for mounting said shelf means thereto.

26. Apparatus as recited in claim 14, wherein said extension member includes at least one ruler measuring device having measuring gradients extending longitudinally of the extension member.

27. Apparatus as recited in claim 21, wherein said vertical guide member includes at least one ruler measuring device having measurement gradations extending longitudinally thereof.

28. Apparatus as recited in claim 14, further including a folding stand configured for free-standing support upon a floor and defining an upper framework portion, said folding stand being suitable for supportively holding the power tool assembly.

29. Apparatus as recited in claim 28, further including a base plate suitable for detachable connection to said upper framework portion of said folding stand, said base plate being suitable for securing to a mounting base of the power tool assembly; said base plate having positioning and retaining means cooperatively configured for engaging said upper framework portion of said stand; whereby said power tool assembly can be supported on said stand by means of said base plate, without requirement of tie-down clamp means.

30. Apparatus configured to be sold in kit form for forming, when assembled, an elongate workpiece folding extension assembly for a power tool assembly of the type having a mounting base and a primary table with a workpiece supporting surface addressed by a working head member of the power tool, comprising:

(a) an elongate extension member having a generally planar workpiece supportive upper surface, said extension member defining proximal and distal ends and being configured to extend from one side of a primary table of a power tool assembly such that the proximal end lies adjacent the primary table and the upper workpiece supportive surface of the extension member defines a continuum of the workpiece supportive surfaces of the primary table; said extension member further having an elongate vertical guide member extending upwardly from said workpiece supportive surface of the extension member and longitudinally extending along the length of said extension member; and (b) coupler means having operably separable portions configured to mount respectively to said extension member and to said power tool assembly for rapidly securing said extension member adjacent said proximal end thereof to said power tool assembly with no free-play therebetween by applying alignment pressure directed through a single point, between said separable portions simultaneously aligning said extension member about three orthogonal axes, with said primary table portion.

31. Apparatus as recited in claim 30, further including a leg member configured for attachment to said elongate extension for operatively supporting said distal end thereof.

32. Apparatus as recited in claim 30, further including measuring clamp apparatus configured for attachment to said vertical guide member, said clamp apparatus having a stop bearing surface extending laterally from the vertical guide and across the workpiece supportive surface of the extension member.

33. Apparatus as recited in claim 31, further including a folding stand configured for free-standing support upon a floor and defining an upper framework portion, said folding stand being suitable for supportively holding the power tool assembly.

34. Extension table apparatus for connection to a power tool assembly of the type having a primary table with a workpiece supporting upper surface addressed by a working head member of the power tool, comprising:
  (a) an elongate extension member having a generally planar workpiece supportive upper surface, said extension member defining proximal and distal ends and being configured to extend from one side of a primary table of a power tool assembly such that said proximal end lies adjacent the primary table and such that the upper workpiece supportive surface of the extension member defines a continuum of the workpiece supportive surface of the primary table;
  (b) a first coupler member configured for fixed engagement to the power tool assembly;
  (c) a second coupler member configured for fixed engagement to said elongate extension, adjacent said proximal end thereof; said first and second coupler members having cooperatively mating engagement members for loosely securing said extension member in general alignment with said primary table portion; and
  (d) tightening means cooperatively mounted to said first and said second coupler members for rapidly applying alignment pressure directed through a single point between said first and said second members, causing said coupler members to rigidly secure said extension to said power tool assembly with no free-play therebetween, and to simultaneously align said extension member with said primary table about three orthogonal axes; whereby the upper workpiece supporting surfaces of said extension member and said primary table portion are longitudinally, laterally and vertically aligned with one another.

35. Extension table apparatus as recited in claim 34, further including a leg member pivotally secured to said elongate extension member adjacent said distal end thereof, for operatively supporting said distal end above a floor surface.

36. Extension table apparatus as recited in claim 35, wherein said leg member further includes adjustment means for selectively varying the operative length of the leg member.

37. Extension table apparatus as recited in claim 35, wherein said leg member is collapsibly foldable against said elongate extension member so as to lie in a direction generally parallel with the upper supportive surface thereof, to facilitate mobility of the extension member and leg assembly when not in operative use.

38. Extension table apparatus as recited in claim 35, further including handle means operatively connected to said extension member for facilitating handcarrying of the extension member.

39. Extension table apparatus as recited in claim 34, wherein said extension member further includes an elongate vertical guide member extending upwardly from said workpiece supportive surface of the extension member and extending longitudinally along the length of said extension member.

40. Extension table apparatus as recited in claim 38, further including at least one ruler measuring device on said elongate extension member, having measuring gradients extending longitudinally of said extension member.

* * * * *